(12) United States Patent
Smith

(10) Patent No.: US 10,784,965 B2
(45) Date of Patent: Sep. 22, 2020

(54) REDUCTION OF RIPPLE ARISING IN LCOS-BASED OPTICAL DEVICES

(71) Applicant: Molex, LLC, Lisle, IL (US)

(72) Inventor: Bradford Smith, Markdale (CA)

(73) Assignee: Molex, LLC, Lisle, IL (US)

(*) Notice: Subject to any disclaimer, the term of this patent is extended or adjusted under 35 U.S.C. 154(b) by 0 days.

(21) Appl. No.: 16/428,526

(22) Filed: May 31, 2019

(65) Prior Publication Data

US 2019/0372674 A1 Dec. 5, 2019

Related U.S. Application Data

(60) Provisional application No. 62/679,307, filed on Jun. 1, 2018.

(51) Int. Cl.
| | |
|---|---|
| *H04B 10/548* | (2013.01) |
| *H04B 10/556* | (2013.01) |
| *H04J 14/02* | (2006.01) |
| *H04Q 11/00* | (2006.01) |

(52) U.S. Cl.
CPC ...... *H04B 10/5561* (2013.01); *H04J 14/0212* (2013.01); *H04Q 11/0005* (2013.01); *H04Q 2011/0016* (2013.01)

(58) Field of Classification Search
CPC .......................... H04B 10/548; H04B 10/5561
See application file for complete search history.

(56) References Cited

U.S. PATENT DOCUMENTS

| | | | | |
|---|---|---|---|---|
| 2013/0088656 | A1* | 4/2013 | Michihata | G02B 26/001 349/33 |
| 2014/0104560 | A1* | 4/2014 | Suh | G02B 6/293 349/196 |
| 2015/0208144 | A1* | 7/2015 | Holmes | H04J 14/02 398/48 |
| 2016/0234575 | A1* | 8/2016 | Wagener | H04Q 11/0005 |
| 2016/0323034 | A1* | 11/2016 | Wagener | H04J 14/0212 |
| 2019/0349112 | A1* | 11/2019 | Seno | G02F 1/31 |

FOREIGN PATENT DOCUMENTS

WO   WO2016071777   * 5/2016 ............ G02B 6/356

\* cited by examiner

*Primary Examiner* — Nathan M Cors
(74) *Attorney, Agent, or Firm* — Molex, LLC

(57) ABSTRACT

A method selects a phase shift profile to be applied to a programmable optical phase shift modulator having an array of pixels. A base stepped phase shift profile for the modulator is selected such that when applied to the modulator, the base stepped phase shift profile allows the modulator to function as a blazed grating steering an optical beam through a prescribed angle. The base stepped phase shift profile has a plurality of segments each extending over a given number of the pixels defining a linear array of pixels. Each segment has first and last pixels in the linear array of pixels. Variations in minimum and maximum luminosity levels among the segments of the base stepped phase shift profile are reduced so that any changes to a slope of each segment arising from reducing the variations in the minimum and maximum luminosity level is maintained below a given amount.

7 Claims, 5 Drawing Sheets

REDUCTION OF RIPPLE ARISING IN LCOS-BASED OPTICAL DEVICES

BACKGROUND

Optical networks use Wavelength Selective Switches (WSS) to dynamically route optical wavelength signals from a source to a destination. WSS devices often rely on wavelength manipulation elements such as liquid crystal on silicon (LCoS) devices or micro-electromechanical (MEMS) mirror arrays to perform the routing.

LCoS devices include a liquid crystal material sandwiched between a transparent glass layer having a transparent electrode, and a silicon substrate divided into a two-dimensional array of individually addressable pixels. Each pixel is individually drivable by a voltage signal to provide a local phase change to an optical signal, thereby providing a two-dimensional array of phase manipulating regions. Manipulation of individual spectral components is possible once an optical signal has been spatially separated by a diffractive element such as a diffraction grating. The spatial separation of spectral components is directed onto predetermined regions of the LCoS device, which can be independently manipulated by driving the corresponding pixels in a predetermined manner.

The liquid crystal material in the LCoS device rotates the polarization of light that passes through it, the extent of the polarization rotation depending on the root-mean-square (RMS) voltage that is applied across the liquid crystal layer. (The incident light on a reflective liquid crystal display thus is of one polarization and the reflected light associated with "on state" is normally of the orthogonal polarization.) The reason that the degree of polarization change depends on the RMS voltage is well known to those skilled in the art. Therefore, by applying varying voltages to the liquid crystal, the ability of the liquid crystal device to transmit or reflect light can be controlled. Since in a digital control application, the pixel drive voltage is either turned to a dark state (off) or to a light state (on), certain modulation schemes must be incorporated into the voltage control in order to achieve a desired gray scale that is between the totally on and totally off positions.

Modulation schemes that are employed to drive the liquid crystal pixel elements must therefore be able to accurately control the amount of time the pixel on and "off", in order to achieve a desired gray scale from the pixel. The degree of rotation of light that occurs follows the RMS voltage across the liquid crystal pixel. The degree of rotation in turn affects directly the intensity of the light that is visible to the observer. In this manner modulating voltages influences the intensity perceived by an observer, thus creating gray scale differences.

The electro-optical properties of many liquid crystal materials cause them to produce a maximum luminosity at a certain RMS voltage (VSAT), and a minimum luminosity at another RMS voltage (VTT). Applying an RMS voltage of VSAT results in a bright cell, or full light reflection, while applying an RMS voltage of VTT results in a dark cell, or minimal light output. Increasing the RMS voltage to a value above that of VSAT, may reduce the luminosity of the cell rather than maintaining it at the full light reflection level. Likewise decreasing the RMS voltage to a value below that of VTT, will normally increase the luminosity of the cell rather than maintaining it at the zero light reflection level. At RMS voltages between VSAT and VTT the percent luminosity increases (or decreases, depending on the electro-optic mode) as the RMS voltage increases. The voltage range between VTT and VSAT therefore defines the useful range of the electro-optical curve for a particular liquid crystal material.

SUMMARY

In accordance with one aspect of the subject matter described herein, a method is provided of selecting a phase shift profile to be applied to a programmable optical phase shift modulator employed in an optical device having a plurality of optical ports. The programmable optical phase modulator has an array of pixels. In accordance with the method, a base stepped phase shift profile is selected for the programmable optical phase shift modulator such that when it is applied to the programmable phase shift modulator the base stepped phase shift profile allows the programmable optical phase modulator to function as a blazed grating that steers an optical beam received by the programmable optical phase modulator through a prescribed angle. The base stepped phase shift profile has a plurality of segments that each extend over a given number of the pixels that define a linear array of pixels. Each segment has a first pixel and a last pixel in the linear array of pixels. Variations in a minimum and maximum luminosity level among the plurality of segments of the base stepped phase shift profile are reduced in such a way that any changes to a slope of each segment arising from reducing the variations in the minimum and maximum luminosity level is maintained below a given amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1A:
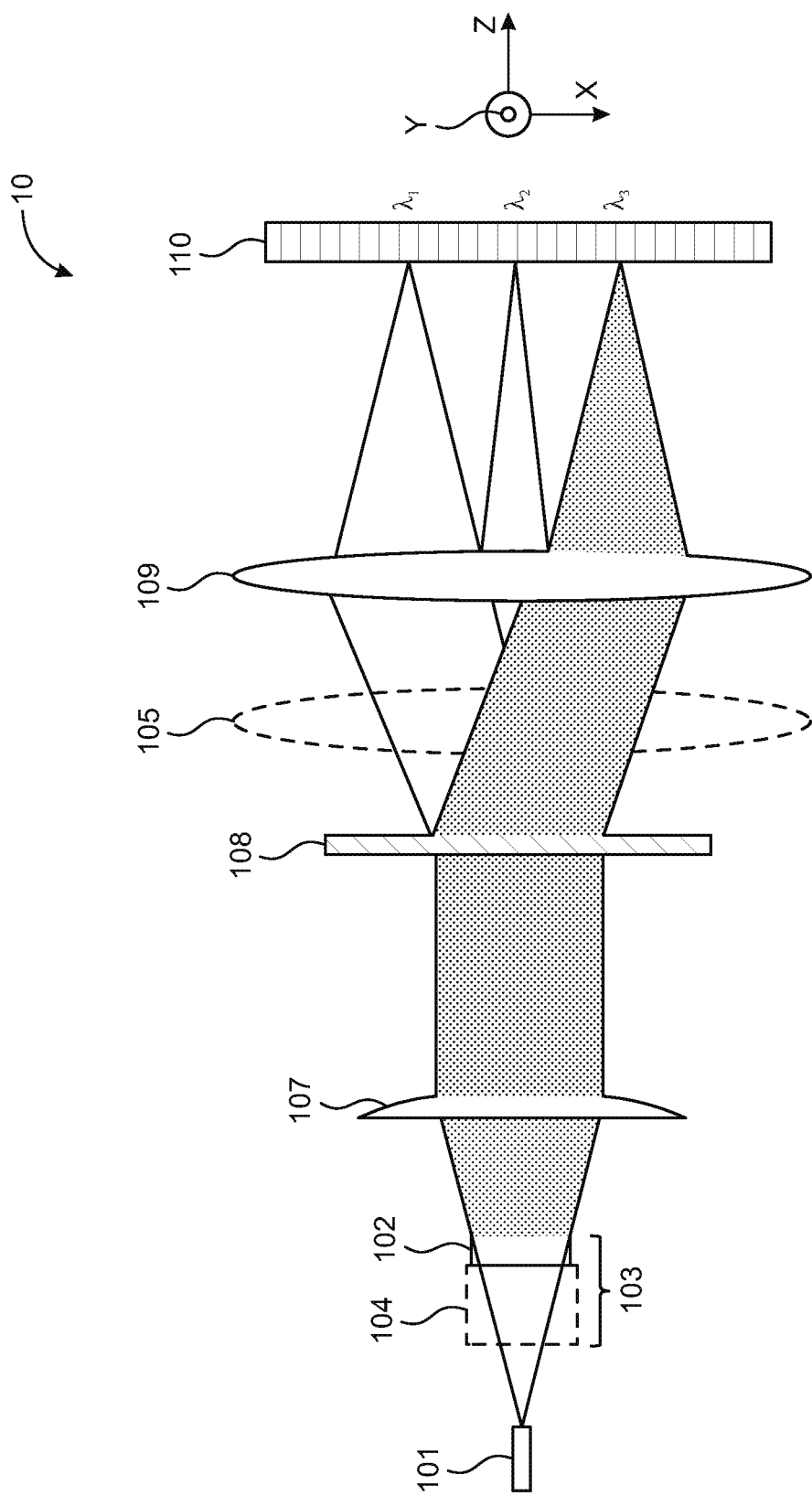
FIGS. 1A and 1B are top and side views respectively of one example of a simplified optical device such as a free-space wavelength selective switch (WSS) that may be used in conjunction with embodiments of the present invention.
Figure 1B:
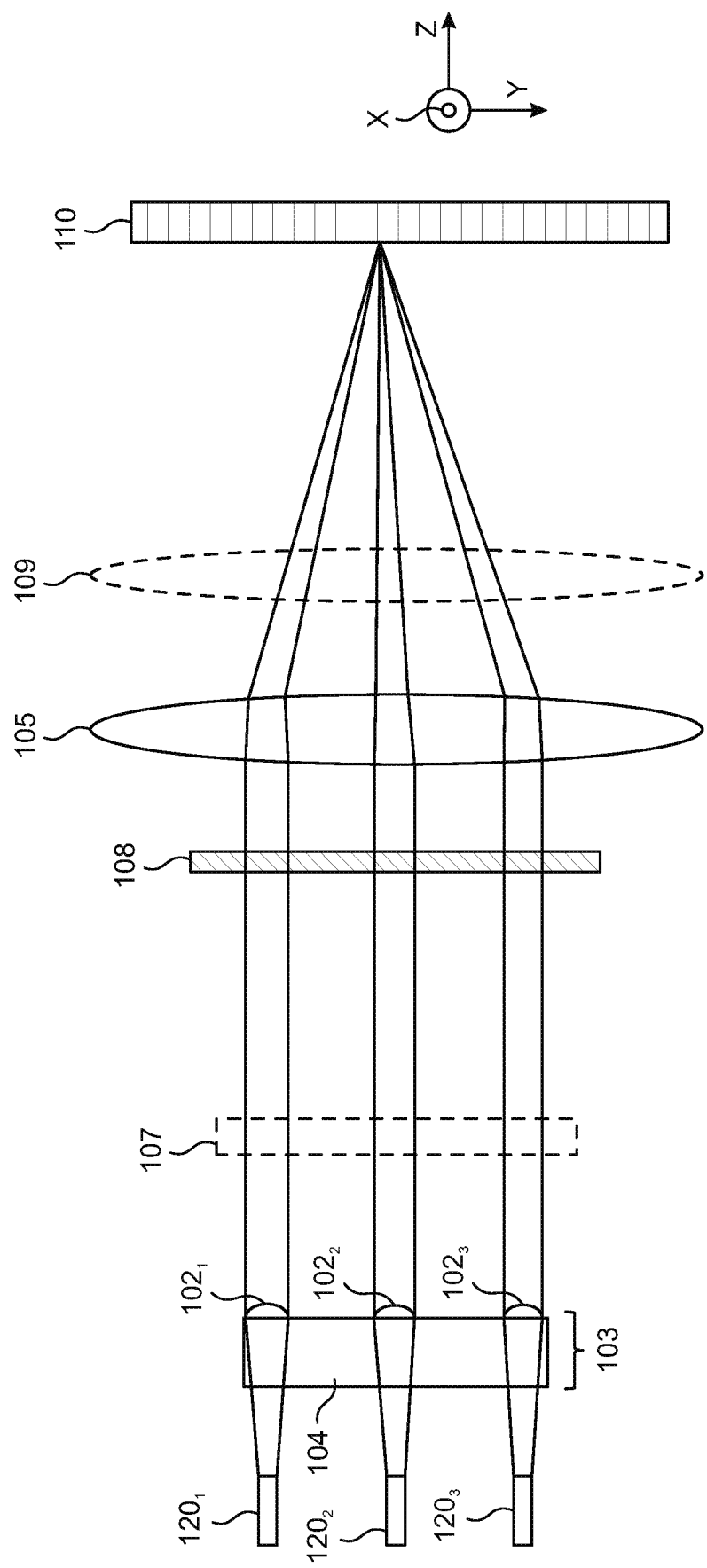

FIGS. 1A and 1B are top and side views respectively of one example of a simplified optical device such as a free-space WSS 10 that may be used in conjunction with embodiments of the present invention. The top view of FIG. 1A illustrates the dispersion plane of the WSS 10 and the side view of FIG. 1B illustrates the port plane of the WSS 10. Light is input and output to the WSS 10 through an array 101 of optical waveguides such as optical fibers which serve as input and output ports. As best seen in FIG. 1B, the array 101 includes a plurality of individual fibers $120_1$, $120_2$ and $120_3$ that receive optical beams that are respectively coupled to micro lenses $102_1$, $102_2$ and $102_3$ ("102") that are supported on or formed on or in an optical module 104, which together define a micro lens array assembly 103. In this example the light exiting from fibers $120_1$, $120_2$ and $120_3$ is parallel to the z-axis. While only three optical fiber/micro lens pairs are shown in FIG. 1B, more generally any suitable number of optical fiber/micro lens pairs may be employed.

In FIGS. 1A and 1B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 1A and 1B the optical elements 108 and 110 are depicted with solid lines in both figures. On the other hand, optical elements 107 and 109 are depicted with solid lines in FIG. 1A (since they have focusing power along the y-axis) and with dashed lines in FIG. 1B (since they leave the beams unaffected along the x-axis). Optical elements 102 and 105 are depicted with solid lines in FIG. 1B (since they have focusing power along the x-axis) and with dashed lines in FIG. 1A (since they leave the beams unaffected in the y-axis).

The optical module 104 in the micro lens array assembly 103 allows the light to propagate therethrough in an unconfined manner. That is, the optical module 104 does not provide any waveguiding function. In a conventional arrangement, the micro lenses $102_1$, $102_2$ and $102_3$ of the lens array assembly 103 are cylindrical lenses that each impart positive optical power in the port plane and leave the beams unaffected in the dispersion plane. The micro lenses $102_1$, $102_2$ and $102_3$ optically couple the light beams to a collimating lens 107 that collimates the beams in the dispersion plane and leaves them unaffected in the port plane. The light beams are then optically coupled from the collimating lens to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The dispersed wavelength components from the dispersion element 108 are directed to the port lens 105.

The port lens 105 leaves the wavelength components unaffected in the dispersion plane and focuses them in the port plane. A frequency lens 109 receives the wavelength components from the port lens 105. The frequency lens 109 focuses the wavelength components in the dispersion plane and leaves them unaffected in the port plane.

The frequency lens 109 couples the wavelength components so that they are now focusd in both planes onto a programmable optical phase modulator, which may be, for example, a liquid crystal-based phase modulator such as a LCoS device 110. The wavelength components are dispersed along the x-axis, which is referred to as the wavelength dispersion direction or axis. Accordingly, each wavelength component of a given wavelength is focused on an array of pixels extending in the y-direction. By way of example, and not by way of limitation, three such wavelength components having center wavelengths denoted $\lambda_1$, $\lambda_2$ and $\lambda_3$ are shown in FIG. 1A being focused on the LCoS device 110 along the wavelength dispersion axis (x-axis).

As best seen in FIG. 1B, after reflection from the LCoS device 110, each wavelength component can be coupled back through the frequency lens 109, port lens 105, dispersion element 108 and lens 107 and micro lens array module 103 to a selected one of the fibers 120 in the fiber array 101.

Figure 2:
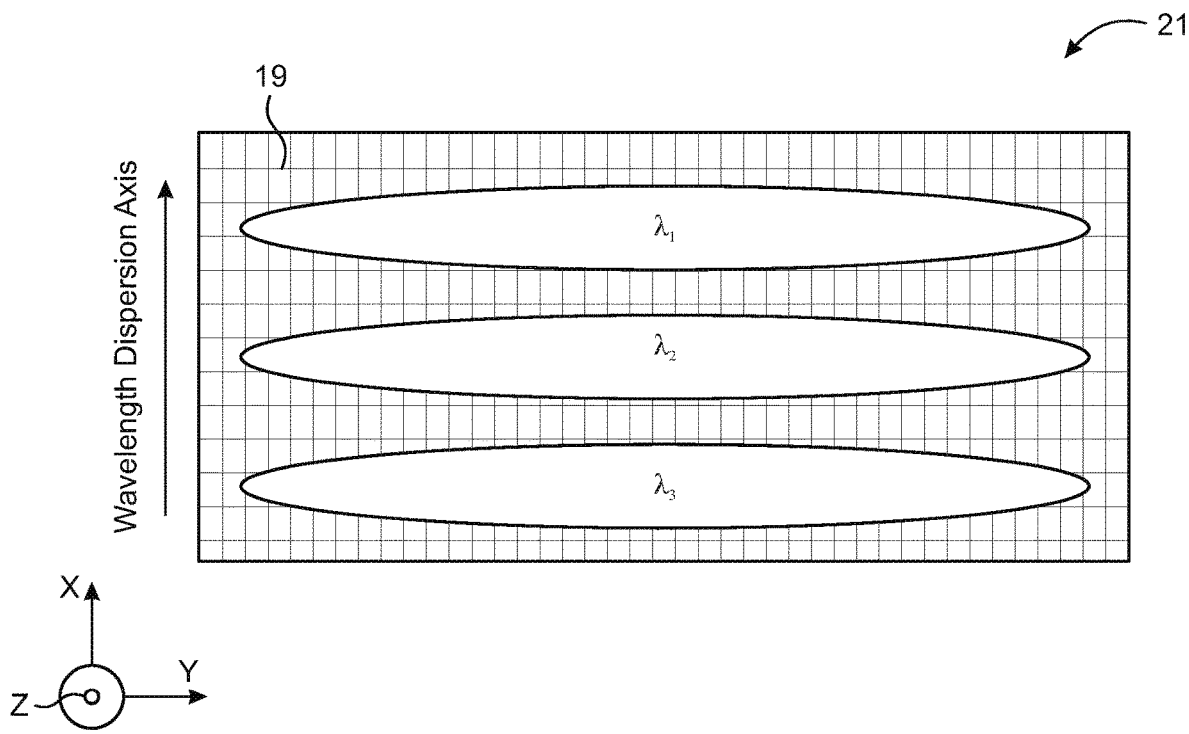
FIG. 2 is a front view of the LCoS device of FIG. 1 extending in the x-y plane.

FIG. 2 is a front view of a LCoS device 21 that may be employed as the spatial light modulator for the optical device shown in FIG. 1. In this illustrative example an optical beam having three wavelength components $\lambda_1$, $\lambda_2$ and $\lambda_3$ are spatially separated along the wavelength dispersion axis (x-axis) and extend along multiple pixels 19 of the LCoS device 21. The elongated cross-section shape of the wavelength components on the spatial light modulator is determined by the difference in the beam waist sizes of the optical beam as controlled by the micro lenses 102. It should be noted that while the wavelength components are illustrated as having an oval cross-sectional shape, more generally the wavelength components may have any cross-sectional shape, including, for instance, crescent shapes.

A programmable optical phase modulator such as a LCoS device produces a phase shift at a given pixel location in a pixel array which is determined programmatically. Such a modulator can be used in multiple ways, forming virtual lenses, prisms or tilted mirrors among other items. Due to the limited thickness and actuation of a LCoS device, the total phase shift that can be achieved at any given location is limited. This limitation can be circumvented in a LCoS device by application of the segmentation technique similar to that used to form a Fresnel lens by compressing the surface power of a lens into a plano surface. Specifically, the total phase shift desired is usually modulo $2\pi$ at the wavelength of interest. The resultant phase is then always less than $2\pi$. Unfortunately, this segmentation technique introduces scattering of light in directions that an un-segmented pattern would not produce. This scattered light is a major reason the crosstalk is naturally higher in an LCoS WSS.

Figure 3:
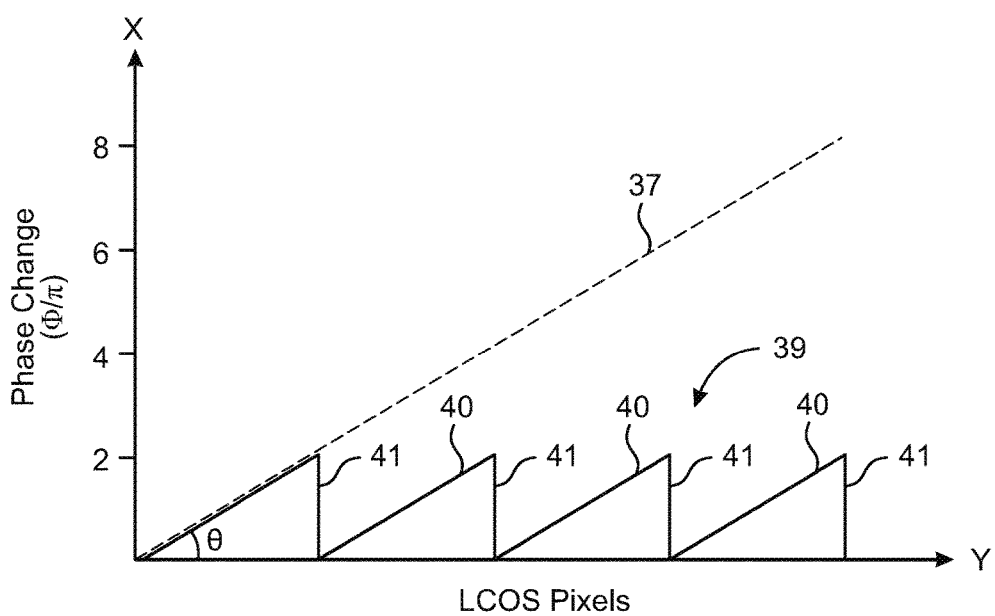
FIG. 3 shows an example of a periodic, stepped phase shift profile that may be produced across a region of a LCoS device in the y-axis.

Turning to FIG. 3, there is illustrated an example of a periodic, stepped phase shift profile 39 that may be produced across a region of a LCoS device 21 along the y-axis. The stepped phase shift profile 39 comprises a sequence of repeating segments 40. The periodic, stepped phase shift profile 39 produces a cumulative phase profile 37. The cumulative steering profile 37 is produced by driving each pixel 19 with a predetermined RMS voltage to provide a desired phase change. As there is a direct relationship between voltage and phase, and a direct relationship between phase and steering angle, a look-up table or the like can be generated which relates the required RMS voltage drive signal with a desired steering angle. The periodic nature of phase is utilized to reduce the required drive voltage. Therefore a periodic, stepped voltage signal will produce the periodic, stepped phase shift profile 39, which in turn produces the cumulative phase profile 37, where phase resets 41 occur, for example, at multiples of $2\pi$ radians. The phase resets 41 define the border between adjacent segments 40. When acting on an incident wavelength component, the phase shift profile 39 produces a steering angle proportional to or equal to 0. Accordingly, by proper adjustment of the periodic, stepped phase shift profile 39 the wavelength components can be selectively directed to a desired one of the optical fibers.

Since the periodic phase changes shown in FIG. 3 correspond to a predetermined RMS voltage, it also corresponds to a predetermined luminosity because, as previously mentioned, as the RMS voltage increases within a certain range, the luminosity increases. That is, the periodic phase changes shown in FIG. 3 that are produced across a region of the LCoS device 21 correspond to periodic changes in luminosity that is produced across a region of the LCoS device 21. That is, FIG. 3 also corresponds to a periodically repeating sequence of luminosity levels that arise across a region of the LCoS device 21.

Figure 4:
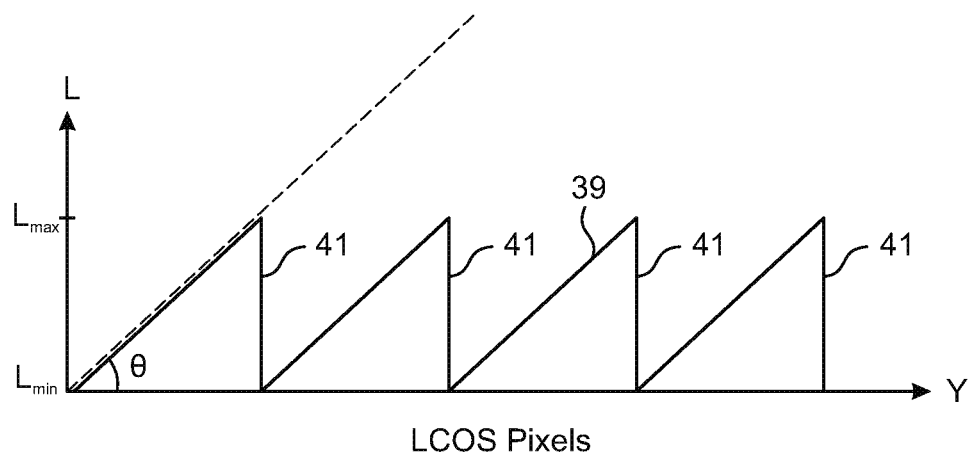
FIG. 4 shows the periodic, stepped phase shift profile of FIG. 3 measured in terms of luminosity.

FIG. 4 relabels the periodic, stepped phase shift profile of FIG. 3 as a periodic range of luminosity levels that arise across the region of the LCoS device 21. As shown, during each period the luminosity increases from a minimum value Lmin to a maximum value Lmax. The RMS drive voltage that is used to produce the various luminosity levels are generally produced by a digital control signal represented by e.g., an 8 bit word producing 256 RMS voltage (and hence luminosity) levels. Thus, as also shown in FIG. 4 Lmin may be thought of as corresponding a value of 0 and Lmax as corresponding to a value of 255 (It should be noted that in practical embodiments Lmin generally corresponds to a bit value greater than 0 and Lmax corresponds to a bit value less than 255).

The periodic phase shift and luminosity profiles respectively shown in FIGS. 3 and 4 are idealizations that assume that the slopes of each repeating segment 40 corresponding to the desired steering angle can be accommodated over a number of pixels that is an even multiple of the number of bits that are used between Lmin and Lmax. Only in this way will the maximum luminosity over each period correspond to the same bit value e.g., 255.

Figure 5:
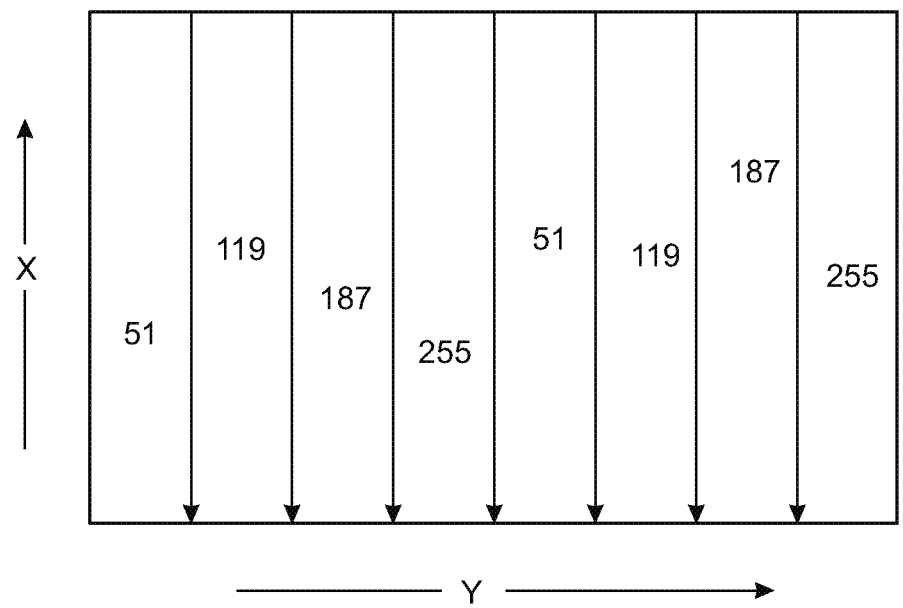
FIG. 5 shows a front view of the LCoS device similar to the view shown in FIG. 2 with columns of constant luminosity that are produced using the phase shift profile of FIG. 4.

FIG. 5 shows a front view of the LCoS device 21 similar to the view shown in FIG. 2. Also shown in FIG. 5 are the columns of constant luminosity over 2 periods (i.e., over 2 segments 40). Each column represents a constant luminosity or gray scale level as indicated by the bit value superimposed on each column. As shown, the luminosity increases over each period in a repeating sequence represented in this example by values 51, 119, 187 and 255.

Figure 6:
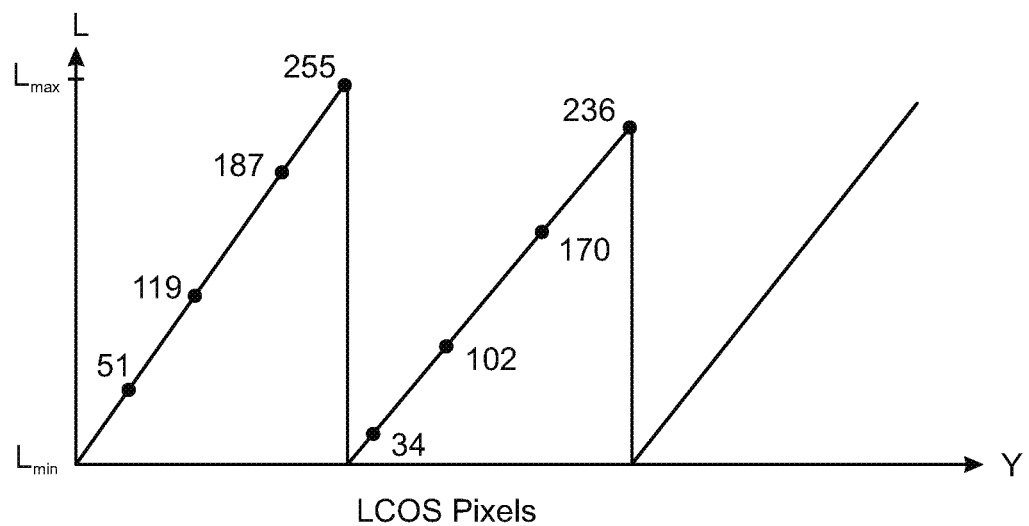
FIG. 6 shows a luminosity profile similar to that shown in FIG. 4 except that in FIG. 6 the slope of each repeating segment corresponding to the desired steering angle cannot be accommodated over a number of pixels that is an even multiple of the number of bits that are used between Lmin and Lmax.

FIG. 6 shows a luminosity profile similar to that shown in FIG. 4 except that in FIG. 6 the slope of each repeating segment 40 corresponding to the desired steering angle cannot be accommodated over a range between Lmin and Lmax. As the figure clearly shows, the bit values corresponding to Lmin and Lmax are not the same for each period. As a consequence in the front view of the LCoS device 21 in FIG. 7 the columns of constant luminosity do not exactly repeat over the 2 periods (i.e., over 2 segments 40) that are shown. Rather, as shown, the first sequence has a luminosity represented by bit values 51, 119, 187 and 255 and the second sequence is represented by bit values 34, 102, 170 and 236.

Figure 7:
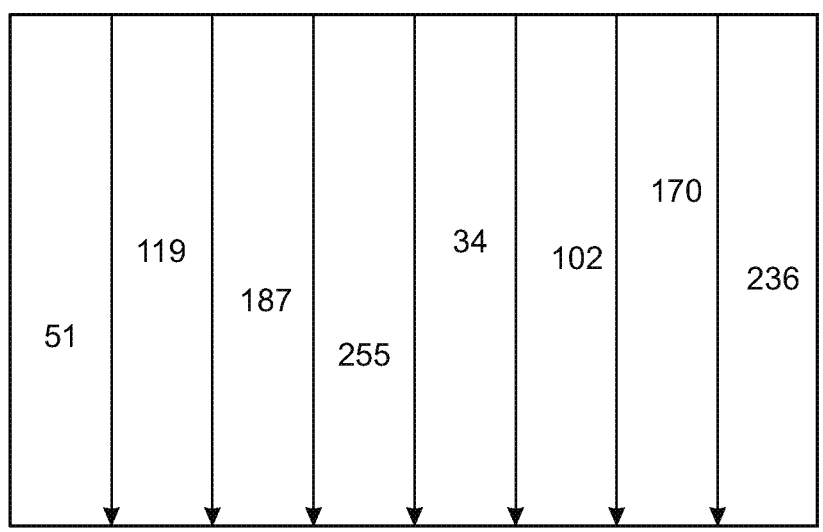
FIG. 7 shows a front view of the LCoS device similar to the view shown in FIG. 2 with columns of constant luminosity that are produced using the phase shift profile of FIG. 6.

It has been found that variations in the minimum and maximum luminosity levels for each repeating segment of the phase shift or luminosity profile such as shown in FIGS. 6 and 7 adversely impact the optical characteristics of optical devices that incorporate LCoS devices such as the wavelength selective switch shown in FIGS. 1A and 1B. In particular, an undesirable ripple has been found to arise in optical signals that are processed by an optical device that uses an LCoS device with a phase shift or luminosity profile that is not uniform over each repeating segment of its stepped phase shift profile.

This ripple can be reduced by adjusting the phase shift or luminosity profile of the LCoS device so that the variations in the minimum and maximum luminosity levels for each repeating segment are reduced or eliminated while the steering angle remains fixed at the desired value. That is, ripple can be reduced by leaving the slope (and hence the steering angle) of the phase shift profile largely unchanged and making the minimum and maximum values of each segment uniform.

The adjustments to the phase shift or luminosity profile that need to be made may be accomplished in any of a variety of different ways. For instance, in one embodiment, the variations in the minimum and maximum luminosity levels may be accomplished in a simple manner by adjusting the luminosity level of the first and/or last pixel in the various segments as necessary to ensure that all the segments are uniform. In another embodiment, the slope of the phase shift or luminosity profile may be adjusted so that the number of the pixels on the programmable phase modulator over which the segments extend is an even multiple of the number of bits used to represent the voltage levels applied to programmable phase modulator between the minimum and maximum luminosity levels.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method of selecting a phase shift profile to be applied to a programmable optical phase shift modulator employed in an optical device having a plurality of optical ports, the programmable optical phase modulator having an array of pixels, comprising:
   selecting a base stepped phase shift profile for the programmable optical phase shift modulator such that when it is applied to the programmable phase shift modulator the base stepped phase shift profile allows the programmable optical phase modulator to function as a blazed grating that steers an optical beam received by the programmable optical phase modulator through a prescribed angle, the base stepped phase shift profile having a plurality of segments that each extend over a given number of the pixels that define a linear array of pixels, each segment having a first pixel and a last pixel in the linear array of pixels;
   reducing variations in minimum luminosity level among the plurality of segments by adjusting a luminosity level of a first pixel in at least one segment; and
   reducing variations in maximum luminosity levels among the plurality of segments by adjusting a luminosity level of a last pixel in at least one segment.

2. The method of claim 1, wherein the luminosity level of the first pixel is adjusted to an average luminosity value of the first pixel and the luminosity level of the last pixel is adjusted to an average luminosity level of the last pixel.

3. The method of claim 1, further comprising reducing variations in luminosity slope of the at least one segment by adjusting luminosity levels of all of the pixels in the at least one segment.

4. The method of claim 1, wherein the changes to the slope of each segment are also minimized from the selected base stepped phase shift profile.

5. The method of claim 1, wherein the optical device is a wavelength selective switch.

6. The method of claim 1, wherein the programmable optical phase modulator includes a liquid crystal-based phase modulator.

7. The method of claim 6, wherein the liquid crystal-based phase modulator is a LCoS device.

* * * * *